Figure 1:
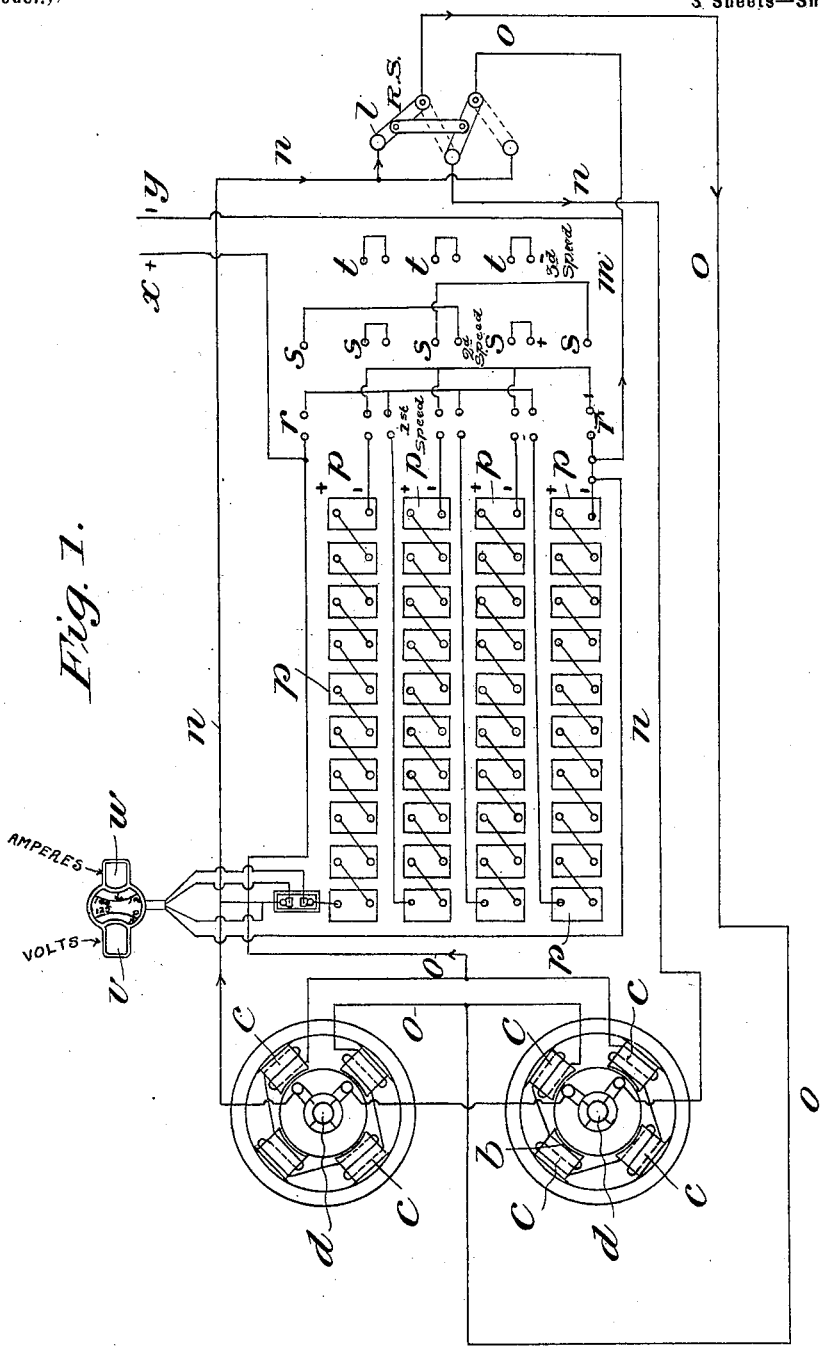

No. 655,563. Patented Aug. 7, 1900.
C. A. LINDSTROM.
ELECTRIC CARRIAGE.
(Application filed Mar. 3, 1900.)

(No Model.) 3 Sheets—Sheet 1.

WITNESSES:
L. C. Hill
Karl H. Butler

INVENTOR:
Chas. A. Lindstrom
By Alexander & Dowell
Attorneys

No. 655,563. Patented Aug. 7, 1900.
C. A. LINDSTROM.
ELECTRIC CARRIAGE.
(Application filed Mar. 3, 1900.)

(No Model.) 3 Sheets—Sheet 3.

WITNESSES:
L. C. Hills
Karl H. Butler

INVENTOR:
Chas. A. Lindstrom,
BY Alexander & Dowell
Attorneys

THE NORRIS PETERS CO., PHOTO-LITHO., WASHINGTON, D. C.

UNITED STATES PATENT OFFICE.

CHARLES A. LINDSTROM, OF CHICAGO, ILLINOIS, ASSIGNOR, BY DIRECT AND MESNE ASSIGNMENTS, TO THE HEWITT-LINDSTROM MOTOR COMPANY, OF SAME PLACE.

ELECTRIC CARRIAGE.

SPECIFICATION forming part of Letters Patent No. 655,563, dated August 7, 1900.

Application filed March 3, 1900. Serial No. 7,146. (No model.)

*To all whom it may concern:*

Be it known that I, CHARLES A. LINDSTROM, of Chicago, in the county of Cook and State of Illinois, have invented certain new and useful Improvements in Electric Carriages; and I hereby declare that the following is a full, clear, and exact description thereof, reference being had to the accompanying drawings, which form part of this specification.

This invention relates to improved electric motors and connections thereof for automobiles or other purposes, and has especial reference, first, to the particular construction of the motors; second, to the relative arrangement of the motors and the electrical connections thereof, and, third, to the electrical connections or wiring of and between two or more motors and an electrical generator or battery whereby the course or direction of flow of the current through the fields and through the armatures of the motors when in operation will be constant or unchanged during all variations in the speed of the motors or in the voltage transmitted thereto.

The objects of the invention are, first, to produce a very small compact motor of low voltage, but high efficiency, which will be capable of sustaining severe usage and sudden variations of current without injury and without heating; second, to use independent motors for propelling one axle or the opposite wheels on one axle, the fields of which motors shall be always connected in parallel, while the armatures of said motors shall be always connected in series during all the variations of the current without the necessity for the employment of any rheostat or resistance between the source of electrical energy and the motors; third, to employ, in combination with such an arrangement of motors, an electrical battery as a source of power and a switch or controller for varying the voltage delivered from said battery, the current being transmitted directly to the motors from the battery without the interposition of any rheostat or like current-reducing device, and the different speeds of the motors being obtained by direct changes in the current produced by various groupings of the battery-cells in multiple, multiple series, or series.

Heretofore multipolar motors have been generally constructed with detachable pole-pieces with a pole-shoe cast on or attached to same, which shoes increase the length of the poles and necessarily make the same larger, and the whole motor therefore must be correspondingly larger and heavier; but the greatest objection to such motors is the "eddy-currents" which result wherever a pole-piece is formed separate from and secured to the magnet-ring by means of bolts or otherwise. It is well known that eddy-currents form at such joints, however close they may be, and cause heating, loss of energy, and consequently shorter life of the battery. In my motor the pole-pieces are cast integral with the field-ring, and the pole-shoes are omitted, and the coils can be first wound and afterward slipped over the field-pieces and secured in the ring in the most compact manner possible, as described in my Patent No. 638,872, dated December 12, 1899, which enables me to greatly reduce the size and weight of the motor, while obtaining the efficiency of a much larger motor of ordinary construction. This efficiency is also due to a departure from the ordinarily-accepted rule regarding the width of the "air-gap" or the distance between the opposed surfaces of the pole-pieces or field-magnets and the armature.

The established rule heretofore prevailing among electrical manufacturers and experts concerning air-gaps between the armatures and field-magnets of motors has been that the air-gaps should not be less than one-quarter of the width of the armature-slot—that is, the groove or slot in the armature-core wherein the wires are placed. The reasons assigned for this rule are, first, with a very small air-gap the excitation is too low to maintain a stiff field at full load; second, eddy-currents become troublesome, and, third, great difficulty arises in maintaining the exact amount of excitation, which is much more essential in multipolar than in bipolar machines. These reasons are sound and correct, so far as their practical application to motors of high voltage is concerned, but are not sound and are, in fact, misleading when it is attempted to apply them to motors of low voltage, (eighty volts and under,) because in such motors I have discovered that such wide air-gaps create resistance, generate heat, and cause a loss of electrical energy. Therefore, contrary to this well-known and established rule, I make the air-gaps in my motors as thin as possible, and by reason of such unusually-thin air-gaps largely increase the efficiency of my motors.

As a concrete example I will state that when the slots or channels in my armature are more than five-sixteenths of an inch wide I use less than three sixty-fourths of an inch air-gap. (It is ten mills below three sixty-fourths of an inch.) Now the chief authorities on electrical engineering also say that if you make the air-gaps any less than one-quarter of the width of the armature-slot—i. e., the groove in the armature-core where the wires are placed—it will cause great sparking of the brushes, destroy the commutator, and produce great heat, and is therefore impractical. This is true with electromotive force of two hundred and fifty volts and up, but not true in my construction, wherein I run two motors with their armatures always in series on eighty volts or less, and thus reduce the electromotive force to forty volts in each armature. It is known in practice that you cannot draw a spark on such low voltage, especially as each armature has thirty-three coils divided in two halves, which reduces the voltage per coil to so small an amount that it absolutely prevents sparking and heat. Again, by the employment of two independent motors to propel the rear wheels or rear axle and having the fields of both motors always in multiple, while the armatures of both motors are always in series, I am enabled to do more work with smaller motors than has heretofore been deemed possible. While on street-car work motors have been arranged so that in certain positions of the controller or switch their fields would be placed in multiple and their armatures placed in series, this condition was only incidental and not a permanent one, as in my invention, and it has always heretofore been necessary to employ a rheostat of great resistance to take care of the current and prevent injury to the motor, and it is only when the electromotive force is at the highest that the fields are placed in parallel in such arrangements as have been heretofore used, and ordinarily the armatures in street-car motors have been arranged so as to be in "shunt."

In my invention the armatures of both motors are always in series and the fields always in multiple, and the windings are calculated on eighty volts in the fields and forty volts in each armature, thereby enabling me to build smaller motors and yet obtain great power. Where the armatures are in shunt with fields, it would increase the speed with require more current, and where the armatures and fields are both parallel it would still further increase the speed, but would also still further consume the current. By my arrangement of the fields always in multiple and armatures always in series I use the least possible amount of current at all times, while obtaining the very highest efficiency. Again, I preferably employ a battery (and for economy a storage battery) as a source of power which is carried upon the vehicle, and a satisfactory battery may be formed by using forty cells of two volts each, arranged in four trays, each containing ten cells, the set of cells in each tray being always connected in series. Between the battery and the motor I use an electrical switch mechanism of suitable construction which is adapted to produce three variations in the electromotive force by variously grouping the battery units or cells. For the first and lowest speed the sets of cells are grouped in parallel or multiple, so as to obtain an electromotive force of twenty volts, which gives twenty volts to the fields and only ten volts to each armature. For the second speed the cells are grouped so as to give an electromotive force of forty volts to the fields and only twenty to each armature. For the third speed all the cells are placed in series, giving eighty volts to the fields and forty volts to each armature. Thus it will be seen that while the course of the electromotive force through the fields and armatures of the motors is unvarying the different speeds are obtained simply by varying the voltage from twenty to forty and eighty volts, without the interposition of any resistance between the source of electrical supply and the motors. My magnet or field-ring is also made very thick and heavy, so as to contain a sufficient number of cubic inches of soft steel or other suitable permeable metal to safely carry the lines of force and to withstand a large overload without heating.

Another advantage of my mode of constructing and connecting the motors, as described, is that when used on vehicles they can readily adjust themselves in turning corners where one wheel on the outside circle and its motor may have to increase their speed, while the wheel on the inner side and its motor may have to decrease their speed or stop, or even revolve in the opposite direction. My motors can accommodate themselves to these varying conditions of service because of their peculiar construction and electrical connections without injury thereto.

The invention has been practically applied to electric automobiles, as indicated in the drawings, and a carriage equipped with my motors, constructed and connected as described and weighing two thousand five hundred pounds, with additional seven hundred and fifty pounds for four passengers, can be operated on twenty-five-per-cent. grades and can be run on eighty volts and seventeen amperes at a speed of thirteen miles per hour on ordinary roads with less than half the amount of current required by the ordinary electric automobiles for similar loads and speeds, and my motors will not heat, while the ordinary motors frequently become so hot as to be incapable of operation until cooled down.

With this general statement of the invention I will now proceed to describe the same in detail with reference to the accompanying drawings, in which—

Figure 2:
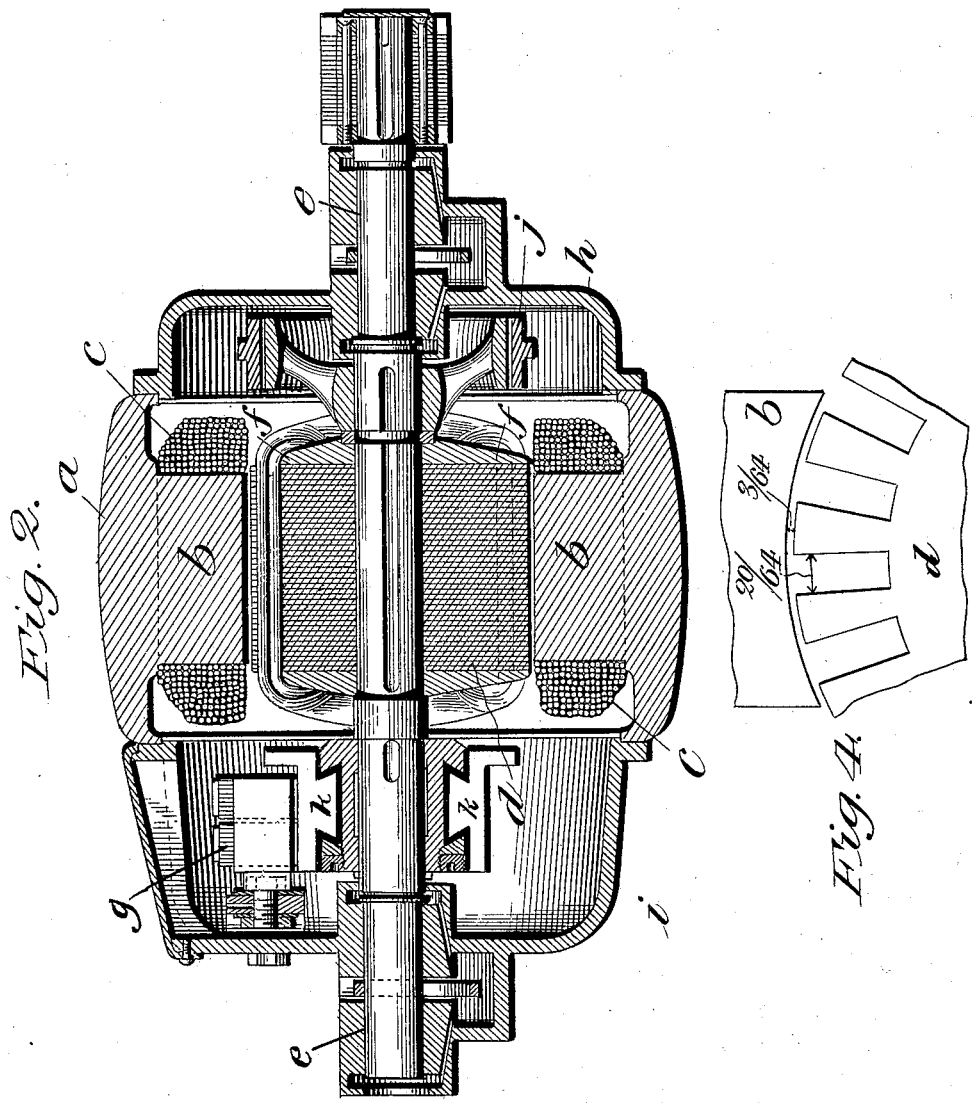
Figure 3:
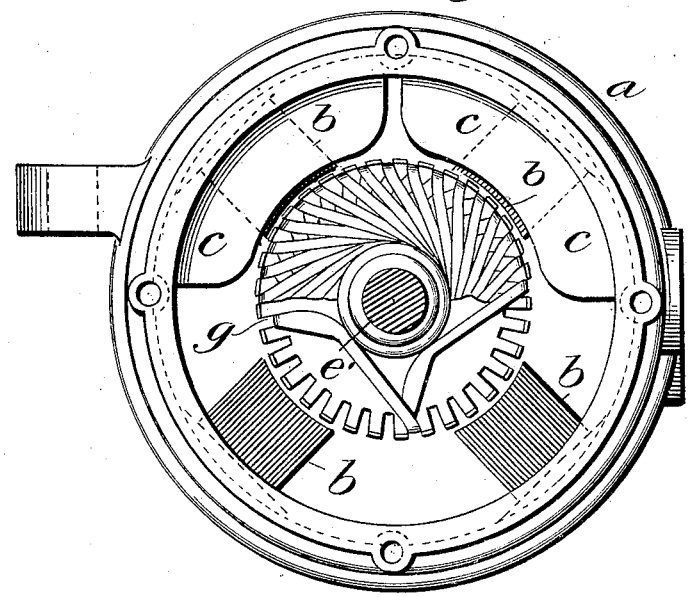
Figure 5:
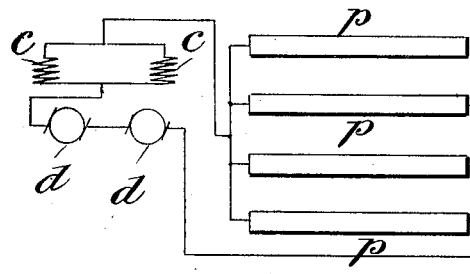
Figure 6:
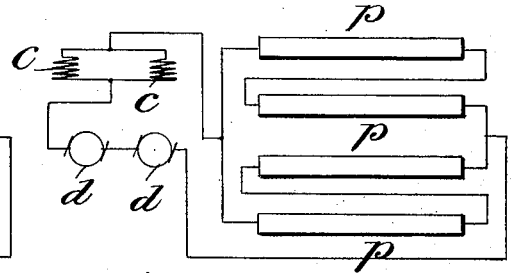
Figure 7:
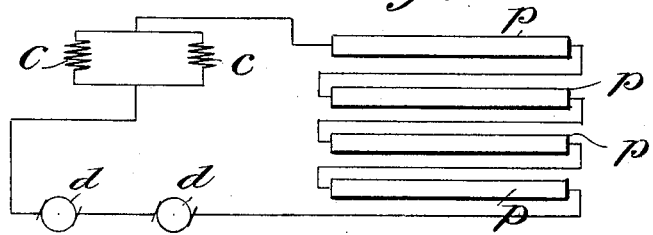

Figure 1 is a diagram illustrating the electrical connection between the motors, battery, and switch. Fig. 2 is an enlarged longitudinal section through one of the motors. Fig. 3 is an end view of one of the motors with the end of casing removed and the commutator removed. Fig. 4 is a detail view illustrating the air-gap. Figs. 5, 6, and 7 are small diagrams illustrating the electrical connections between the battery and motors for different speeds.

Referring to the drawings, $a$ designates the field-ring of the motor, which is cast with four inwardly-projecting equidistant pole-pieces $b$, around which can be slipped coils $c$, of wire, these poles and coils forming the field-magnets of the motor, and the coils $c$ in each motor being connected in series, as indicated in the drawings. The core $d$ of the armature is preferably made up of laminated sections secured upon the armature-shaft by means of the end plates $f$, as shown. This armature, as shown, has thirty-three coils divided into two halves. It will be observed that the armature is of such diameter that its periphery almost touches the field-magnets, and it is a feature of my invention to make the "air-gap," as the space between the periphery of the armature and the inner end of the pole-pieces $b$ or field-magnets is termed, as small as possible.

While the accepted rule, as above stated, (upon which all motors, so far as I am aware, have been heretofore constructed,) is that the air-gaps shall not be less than one-fourth the width of the armature-slot—$i.$ $e.$, the slots or grooves in the armature-core wherein the wires are placed—I go directly contrary to this rule and make the air-gap as thin as possible. For example, where my armature slot or channel is not more than twenty sixty-fourths of an inch in width I have an air-gap less than three sixty-fourths of an inch in thickness. The beneficial results of this construction I have before pointed out and will not repeat; but I claim to be the first to have discovered that it was practically advantageous to make the air-gap as thin as possible in motors of low voltage.

The field-ring $a$ can be conveniently used as part of the motor-casing, and, as shown, it has attached to its opposite ends the hood-castings $h$ and $i$, in which are formed the journal-bearings $e$ for the armature-shaft. The hood $h$ incloses and protects the brake mechanism $j$ of the motor (which is not claimed herein) and the hood $i$ incloses the commutator $k$, which is of ordinary construction and need not be particularly described herein, but preferably the commutator-bars are made unusually thick in order to avoid heating of the brushes $g$ and consequent sparking.

I have shown in Fig. 1 two motors which may be applied to the running-gear of a vehicle, so that the opposite drive-wheels thereon can be directly driven from the motor-shaft by means of gearing, as usual. The particular manner of suspending the motors and the particular gearing between the motors and the vehicle-wheels do not form part of the present invention and are not shown herein.

The manner of wiring the motors is illustrated clearly in the diagram Fig. 1, wherein it will be seen that the field-coils $c$ of each motor are in series as usual, but the fields of the two motors are connected to the battery in multiple, while the armatures $d$ of the two motors are connected in series. This connection is unvarying, no matter how the electromotive force may be changed, and the voltage passing through the armatures will always be of exactly one-half that passing through the fields.

When applied to vehicles, I preferably employ a storage battery as the source of power, which battery is carried in the body of the vehicle, and the electrical connections between the battery and the motors are best shown in the diagram Fig. 1, from which an electrical engineer will readily understand how the connections should be made. A reversing-switch $l$ of ordinary construction is employed, located at a suitable point in the usual manner, and this switch is properly connected by a wire $m$ to one terminal of the battery and by a wire $n$ to the armatures of the motors, so that the current will be sent always through the armatures of the motors in series, this wire $n$ leading back to the other pole of the switch $l$, so that the current will pass through the switch to another wire $o$, which is connected to the fields of the motors in multiple, and the wire $o$ leads back to the other terminal of the battery. Thus the current flows always through the motor-armatures in series and through the motor-fields in multiple. Of course by shifting the reversing-switch $l$ the direction in which the current will flow through the fields and armatures will be reversed, as is well known.

As shown, the battery is composed of forty cells of two volts each, and for convenience in handling these cells are arranged in four sets $p$ of ten cells each, each set being placed in a tray, and the cells in each set $p$ are connected in series. The switch mechanism is placed in a convenient location on the carriage and is of any suitable construction and such that in one position the cells will be grouped as indicated in the diagram Fig. 1 by the series of contacts $r$, and in this position of the switch the four sets $p$ of batteries will be in multiple, as indicated in Fig. 5. Consequently an electromotive force of twenty volts will be delivered to the field and ten volts to the armatures, and this will give the lowest speed. When the switch is shifted to the second position, as indicated in Fig. 6, the cells will be grouped as indicated by the series of contacts $s$ in Fig. 1, which will result in an equal division of the battery into two sets of twenty cells each, connected in series and these two sets being arranged in multiple, as indicated in Fig. 6, which will give forty volts through the fields and twenty volts through the armatures. This will give the second speed. Finally, the switch may be shifted to group the cells as indicated by the series of contacts *t* in Fig. 1, which will result in all the cells in the battery being placed in series, as indicated in Fig. 7, which will give eighty volts through the fields and forty volts through the armatures.

I do not consider it necessary herein to go into a particular explanation of the construction of the switch, as any suitable switch mechanism may be employed, and many such are well known to electrical engineers. The essential feature of this portion of my invention is the employment of motors with their fields always in multiple and their armatures always in series, a source of electrical energy, preferably a battery, and a switch mechanism whereby the voltage of the battery may be varied so as to change the current passing through the motors without changing the wiring of the motor fields or armatures and without employing any exterior resistance.

By the described arrangement I dispense with rheostats or exterior resistance between the battery and motors, and thus greatly economize the limited supply of power obtainable from the battery, as all extra resistance introduced into a circuit causes heat and consumes power.

In Fig. 1, I have indicated at *v* the volt-meter, and at *w* the ampere-meter, which are combined in one and the ordinary connection of such meter to the main wires. This meter would be conveniently located on the vehicle in sight of the operator. At *x* and *y* are indicated the wires for recharging the battery.

The wire for the armature-windings should be of a gage capable of easily carrying the full current of the batteries, and a somewhat smaller wire is used for the field-windings in order to obtain the resistance necessary to safely withstand the variations in the current from the battery due to the variations in the groupings of the cells thereof and obtain the greatest efficiency possible with an economical expenditure of power in a low-voltage multipolar motor, and by reason of the thin air-gaps, and thus winding the fields, the motors have a very strong torque, and since the voltage under all conditions of speed must be twice as great in the fields as in the armatures no exterior rheostat or resistance is needed to regulate the electromotive force in the armatures.

The motors are of high efficiency, and at twenty-volts pressure with no load the armatures will run nine hundred and fifty revolutions per minute and consume only five amperes—*i. e.*, about one hundred watts less than two sixteen candle-power lamps would require.

What I claim is—

1. The combination of a battery, a pair of electrical motors having their fields connected in multiple and their armatures connected in series, and electrical connections between said motors and the battery; with a switch interposed in the circuit between the motors, whereby the speed of the motors may be changed by varying the electromotive force from the battery while maintaining the motor-fields always in multiple and the motor-armatures always in series.

2. The combination of two multipolar motors, the fields of both motors being permanently connected in multiple and the armatures of both motors being permanently connected in series, and the air-gaps between the armatures and the field-magnets being less than one-fifth the width of the armature-slots, with an electrical battery and connections between said battery and the motors, and means for changing the electromotive force derived from the battery, interposed between the battery and the motors.

3. The combination of two multipolar motors for electrical vehicles, each having its field ring and poles or field-magnets cast integral and its field-coils connected in series, the fields of both motors being permanently connected in multiple and the armatures of both motors permanently connected in series; and the air-gaps between the armatures and the field-magnets being one-fifth or less of the width of the armature-slots; with an electrical battery and connections between said battery and the motors, and means interposed between the batteries and the motors for grouping the cells of the battery so as to change the electromotive force derived therefrom and thereby vary the speed of the motor, all substantially as and for the purpose described.

4. In an electric automobile, the combination of the axle, the independent motors supported near the opposite ends of the axle, said motors having their fields always connected in parallel and their armatures always connected in series, and an electrical battery composed of sets of units, the units in each set being connected in series; with a switch mechanism interposed in the circuit between the battery and the motors and adapted to connect the sets of battery-units in multiple, multiple series or series, thereby varying the voltage of the current from low to high and regulating the speed accordingly, while always maintaining the multiple connection of the motor-fields and the series connections of the motor-armatures, substantially as and for the purpose described.

In testimony that I claim the foregoing as my own I affix my signature in presence of two witnesses.

CHARLES A. LINDSTROM.

Witnesses:
ARTHUR E. DOWELL,
WM. CLEARY SULLIVAN.